United States Patent
Atohira et al.

(10) Patent No.: US 9,352,467 B2
(45) Date of Patent: May 31, 2016

(54) ROBOT PROGRAMMING APPARATUS FOR CREATING ROBOT PROGRAM FOR CAPTURING IMAGE OF WORKPIECE

(71) Applicant: FANUC Corporation, Yamanashi (JP)

(72) Inventors: Hiroyuki Atohira, Yamanashi (JP); Yoshiharu Nagatsuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/603,396

(22) Filed: Jan. 23, 2015

(65) Prior Publication Data

US 2015/0209963 A1    Jul. 30, 2015

(30) Foreign Application Priority Data

Jan. 24, 2014   (JP) ................................ 2014-011419

(51) Int. Cl.
*B25J 9/16*   (2006.01)
(52) U.S. Cl.
CPC .............. *B25J 9/1697* (2013.01); *B25J 9/1671* (2013.01); *B25J 9/1692* (2013.01); *G05B 2219/39397* (2013.01); *Y10S 901/47* (2013.01)
(58) Field of Classification Search
CPC combination set(s) only.
See application file for complete search history.

(56) References Cited

U.S. PATENT DOCUMENTS

| 6,642,922 | B1 * | 11/2003 | Noda | ..................... B25J 9/1671 345/419 |
|---|---|---|---|---|
| 7,881,917 | B2 * | 2/2011 | Nagatsuka | ............. B25J 9/1671 703/6 |
| 8,108,092 | B2 * | 1/2012 | Phillips | ................ G05D 1/0033 700/245 |
| 8,457,791 | B2 * | 6/2013 | Shi | ......................... B25J 9/1697 700/1 |
| 8,571,714 | B2 * | 10/2013 | Gienger | ................. G05B 19/42 318/568.16 |
| 9,089,971 | B2 * | 7/2015 | Aoba | ..................... B25J 9/1697 318/568.11 |
| 2003/0078694 | A1 * | 4/2003 | Watanabe | .............. B25J 9/1697 700/245 |
| 2003/0144765 | A1 * | 7/2003 | Habibi | ................... B25J 9/1697 700/259 |
| 2004/0189675 | A1 * | 9/2004 | Pretlove | ................ B25J 9/1656 345/633 |
| 2005/0096892 | A1 * | 5/2005 | Watanabe | ............. B25J 9/1671 703/7 |
| 2007/0276541 | A1 * | 11/2007 | Sawasaki | ............. G05D 1/0246 700/253 |

(Continued)

FOREIGN PATENT DOCUMENTS

| JP | H06-328385 A | 11/1994 |
|---|---|---|
| JP | 2002-86376 A | 3/2002 |

(Continued)

*Primary Examiner* — Jonathan L Sample
(74) *Attorney, Agent, or Firm* — Hauptman Ham, LLP (57) ABSTRACT

A robot programming apparatus includes a virtual space creation unit for creating a virtual space that expresses a work space in three dimensions; a target portion designation unit for designating a target portion whose image is to be captured by an image pickup device, on a workpiece model arranged in the virtual space; a position determination unit for determining at least one position of the image pickup device for capturing the image of the target portion in the virtual space; a position storage unit for storing the at least one position of the image pickup device; and an image pickup program creation unit for creating an image pickup program to be taught to a robot so that the image pickup device captures the image of the target portion according to the at least one position of the image pickup device stored in the position storage unit.

8 Claims, 11 Drawing Sheets

(56) References Cited

U.S. PATENT DOCUMENTS

| | | | |
|---|---|---|---|
| 2007/0282485 A1* | 12/2007 | Nagatsuka | B25J 9/1671 700/245 |
| 2008/0013825 A1* | 1/2008 | Nagatsuka | B25J 9/1671 382/153 |
| 2008/0249659 A1* | 10/2008 | Ueyama | B25J 9/0018 700/245 |
| 2008/0267450 A1* | 10/2008 | Sugimoto | A63H 17/395 382/103 |
| 2011/0106339 A1* | 5/2011 | Phillips | G05D 1/0033 701/2 |
| 2011/0218776 A1* | 9/2011 | Shono | G06F 17/50 703/1 |
| 2012/0166165 A1* | 6/2012 | Nogami | B25J 9/1671 703/6 |
| 2012/0294509 A1* | 11/2012 | Matsumoto | B25J 5/007 382/153 |
| 2013/0238131 A1* | 9/2013 | Kondo | B25J 9/1697 700/259 |
| 2013/0266205 A1* | 10/2013 | Valpola | B25J 9/1669 382/153 |
| 2014/0009583 A1* | 1/2014 | Suzuki | G06T 7/0065 348/46 |
| 2014/0163736 A1* | 6/2014 | Azizian | A61B 19/2203 700/259 |

FOREIGN PATENT DOCUMENTS

| | | |
|---|---|---|
| JP | 2002-326176 A | 11/2002 |
| JP | 2003-191194 A | 7/2003 |
| JP | 2006-48244 A | 2/2006 |
| JP | 2006-260271 A | 9/2006 |
| JP | 2007-160486 A | 6/2007 |
| JP | 2007-334678 A | 12/2007 |
| JP | 2008-21092 A | 1/2008 |
| JP | 2009-303013 A | 12/2009 |

* cited by examiner

ROBOT PROGRAMMING APPARATUS FOR CREATING ROBOT PROGRAM FOR CAPTURING IMAGE OF WORKPIECE

RELATED APPLICATIONS

The present application claims priority to Japanese Application Number 2014-011419, filed Jan. 24, 2014, the disclosure of which is hereby incorporated by reference herein in its entirety.

BACKGROUND OF THE INVENTION

1. Field of the Invention

The present invention relates to a robot programming apparatus for creating a robot program to be taught to a robot used to process a workpiece.

2. Description of the Related Art

There is known a structure for a robot system used to process a workpiece, which is provided with an image pickup device for capturing an image of a portion of the workpiece that is to be processed. Since workpieces vary in shape depending on individual ones, a workpiece processing program is corrected by capturing an image of a portion to be processed using an image pickup device and processing the obtained image. JP-A-06-328385, JP-A-2002-086376, JP-A-2003-191194, JP-A-2007-160486, and JP-A-2009-303013 disclose various techniques for determining a position and a posture of a visual sensor to detect a target object.

JP-A-06-328385 discloses a posture control method for controlling a posture of a visual sensor so that a position of a target portion to be welded can be detected. In this technique, the posture of the visual sensor is controlled in each sampling cycle so that a detection target is always arranged in the center of a visual field of the visual sensor even when a tool moves.

JP-A-2002-086376 discloses a guiding method for guiding a visual sensor attached to a tip of a hand of a manipulator to a target object to be detected. In this technique, a position for guiding the sensor is determined based on an approximate position of the target object and a distance between a predetermined position for guiding the sensor and the target object.

JP-A-2003-191194 discloses correcting the position for guiding a visual sensor in the technique disclosed in JP-A-2002-086376, according to a designated offset in order to avoid an obstacle positioned around the position for guiding the visual sensor.

JP-A-2007-160486 discloses an off-line programming apparatus configured to automatically create a measurement program for capturing an image of a reference point of a workpiece using a visual sensor.

JP-A-2009-303013 discloses an image pickup direction determination program for determining an image capturing direction of an image pickup apparatus configured to capture an image of a surrounding target object in order to estimate a present position of a movable robot configured to move to a predetermined target point.

In the conventional techniques, it is necessary to determine a position of the image pickup device used to capture an image of the target portion to be captured. However, determination of the position of the image pickup device usually requires a lot of time and labor, thus reducing work efficiency. There has thus been a need to determine, efficiently in a short period of time, the position of an image pickup device when the image pickup device captures an image of a target portion.

SUMMARY OF THE INVENTION

According to a first aspect of the present invention, there is provided A robot programming apparatus for creating a robot program to be taught to a robot which is used to process a workpiece arranged in a work space, the robot programming apparatus comprising: a virtual space creation unit for creating a virtual space that expresses the work space in three-dimensions; a target portion designation unit for designating a target portion whose image is to be captured by an image pickup device, on a model of the workpiece arranged in the virtual space; a position determination unit for determining at least one position of the image pickup device for capturing the image of the target portion by the image pickup device in the virtual space; a position storage unit for storing the at least one position of the image pickup device determined by the position determination unit; and an image pickup program creation unit for creating an image pickup program to be taught to the robot so that the image pickup device captures the image of the target portion according to the at least one position of the image pickup device stored in the position storage unit.

According to a second aspect of the present invention, in the robot programming apparatus according to the first aspect, the position determination unit is configured to determine the at least one position of the image pickup device in which the image pickup device has a predetermined positional relationship with respect to the target portion.

According to a third aspect of the present invention, in the robot programming apparatus according to the second aspect, the position determination unit includes a visual field designation unit for designating a range of a visual field of the image pickup device and is configured to determine the at least one position of the image pickup device in which a full image of the target portion can be captured, based on the predetermined positional relationship between the image pickup device and the target portion and the range of the visual field.

According to a fourth aspect of the invention, the robot programming apparatus of the third aspect further includes a judgment unit for judging whether or not the full image of the target portion can be captured when the image pickup device is arranged in one position determined by the position determination unit, and wherein the position determination unit is configured to determine an additional position of the image pickup device different from the one position when the judgment unit judges that the full image of the target portion cannot be captured.

According to a fifth aspect of the invention, in the robot programming apparatus of the fourth aspect, the position determination unit is configured, when determining a plurality of positions of the image pickup device, to determine the plurality of positions of the image pickup device so that the image pickup device in the respective positions adjacent to each other has ranges of visual fields so as to superimpose on each other over a predetermined range.

According to a sixth aspect of the invention, in a robot programming apparatus according to any of the second to the fifth aspects, the predetermined positional relationship between the image pickup device and the target portion is designated by a distance between the image pickup device and the target portion.

According to a seventh aspect of the invention, in the robot programming apparatus according to the sixth aspect, the distance between the image pickup device and the target portion is a distance along a direction perpendicular to a surface of the workpiece including the target portion.

According to an eighth aspect of the invention, the robot programming apparatus according to any of the first to the seventh aspects further includes a processing program creation unit for creating a processing program for processing the workpiece, based on a shape of the target portion obtained by simulating the image pickup program in the virtual space.

According to a ninth aspect of the invention, the robot programming apparatus according to any of the first to the eighth aspects further includes a processing program creation unit for creating a processing program for processing the workpiece, based on an image of the target portion obtained by executing the image pickup program.

According to a tenth aspect of the invention, in the robot programming apparatus according to any of the first to the ninth aspects, the target portion is a point, a line, or a plane on the surface of the workpiece.

According to an eleventh aspect of the invention, in the robot programming apparatus according to any of the first to the tenth aspects, the image pickup program includes a teaching content for the robot that controls a position and a posture of at least one of the image pickup device and the workpiece.

According to a twelfth aspect of the invention, in the robot programming apparatus according to any of the first to the tenth aspects, the image pickup program includes a teaching content for teaching the image pickup device fixed so as to have a predetermined positional relationship determined by the position determination unit with respect to the workpiece fixed to a predetermined position, so that the image pickup device captures the image of the target portion of the workpiece.

These and other objects, features and advantages of the present invention will become more apparent in light of the detailed description of exemplary embodiments thereof as illustrated by the drawings.

DETAILED DESCRIPTION OF THE INVENTION

Exemplary embodiments of the present invention will be described below with reference to the accompanying drawings. For better understanding of the present invention, constituent elements of the embodiments depicted in the drawings vary in scale as necessary.

Figure 1:
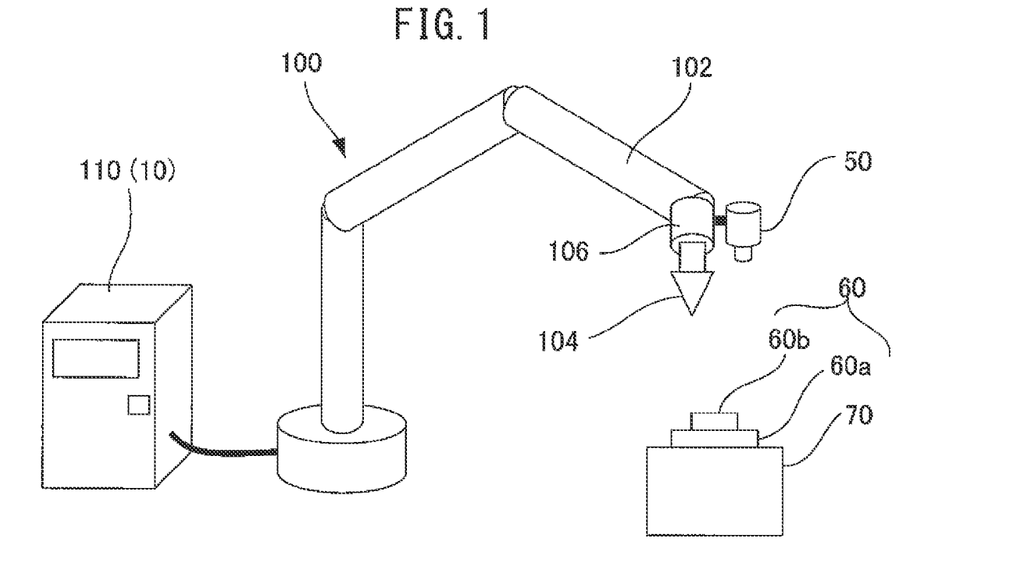
FIG. 1 is a schematic diagram depicting a robot, a workpiece, and an image pickup device attached to the robot arranged in a work space.

FIG. 1 is a schematic diagram depicting a robot 100, a workpiece 60, and an image pickup device 50 attached to the robot 100 arranged in a work space. The robot 100 includes a processing tool 104 attached to a wrist 106 at a tip of an arm 102. The robot 100 is operated according to a control program taught by a control device 110 and is configured to be able to change a position and a posture thereof as necessary. The control device 110 includes an input means such as a keyboard and a mouse and a storage unit for storing various data and programs. In addition, the control device 110 may also include a display unit such as an LCD.

The image pickup device 50 is fixed near the wrist 106. The image pickup device 50 is, for example, a visual sensor including an image pickup element such as a CCD. The image pickup device 50 is adapted to change a position and a posture thereof in conjunction with the movement of the robot 100.

The workpiece 60 is fixed to a jig 70 such as a workbench arranged near the robot 100. The workpiece 60 is, for example, a substantially plate-shaped member formed by cutting a surface thereof. The workpiece 60 depicted in the drawing has a lower portion 60a fixed to the jig 70 and an upper portion 60b protruding on a side opposite to a surface of the lower portion 60a in contact with the jig 70. The workpiece 60 is arranged within a movable range of the processing tool 104 attached to the wrist 106 of the robot 100, in order to execute, for example, deburring processing.

The image pickup device 50 is used, for example, to capture an image of a processing portion of the workpiece 60 that is to be processed by the processing tool 104. Alternatively, the image pickup device 50 may be used to accurately detect a position of a hole formed in the workpiece 60.

According to the present embodiment, the robot 100 is controlled according to an image pickup program, so as to position the image pickup device 50 in a predetermined position with respect to a target portion of the workpiece 60 whose image is to be captured. The image pickup program is created by a robot programming apparatus 10. The robot programming apparatus 10 may be incorporated in the robot control apparatus 110 or may be provided separately from the robot control apparatus 110.

Figure 2:
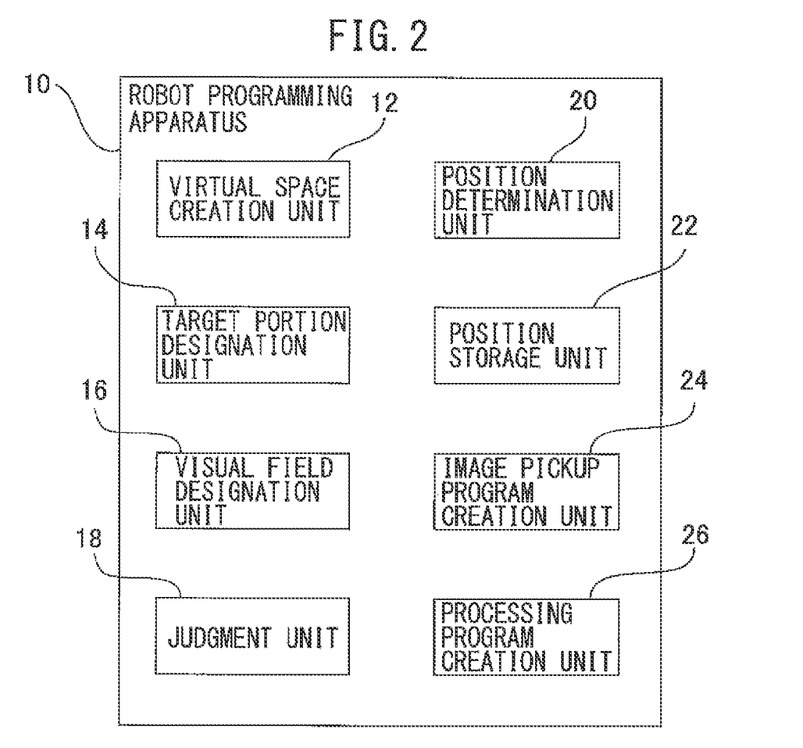
FIG. 2 is a functional block diagram of a robot programming apparatus according to one embodiment of the present invention.

FIG. 2 is a functional block diagram of the robot programming apparatus 10 according to one embodiment of the present invention. As depicted in the drawing, the robot programming apparatus 10 includes a virtual space creation unit 12, a target portion designation unit 14, a visual field designation unit 16, a judgment unit 18, a position determination unit 20, a position storage unit 22, an image pickup program creation unit 24, and a processing program creation unit 26.

The virtual space creation unit 12 has a function of creating a virtual space that expresses a work space in three dimensions, for example, as depicted in FIG. 1. The virtual space creation unit 12 is configured to arrange a robot model (hereinafter referred to simply as "robot") 100, a processing tool model (hereinafter referred to simply as "processing tool") 104, an image pickup device model (hereinafter referred to simply as "image pickup device") 50, and a workpiece model (hereinafter referred to simply as "workpiece") 60, respectively, in the virtual space according to a predetermined three-dimensional shape model. The virtual space created by the virtual space creation unit 12 and the respective models of the elements arranged in the virtual space are displayed on a display unit such as an LCD, which is not shown.

Figure 3:
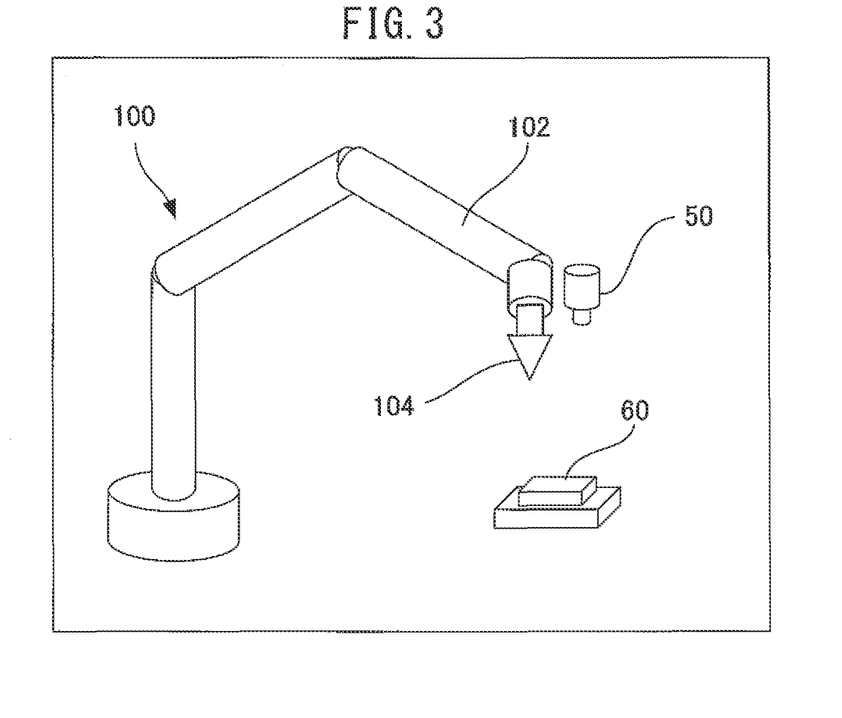
FIG. 3 is a diagram depicting an exemplary display of a robot, an image pickup device, and a workpiece arranged in a virtual space.

FIG. 3 depicts an exemplary display showing the robot 100, the image pickup device 50, and the workpiece 60 arranged in the virtual space. When considering only the purpose of determining a position of the image pickup device 50 with respect to the workpiece 60 in an image pickup step, the robot 100 and the processing tool 104 may not be displayed. Elements other than the workpiece 60 may be displayed in simplified models, instead of the three-dimensional shape models. For example, when the image pickup device 50 is displayed in the virtual space, any other simplified models may also be used, as long as the position and a visual line direction of the image pickup device 50 can be visually recognized.

The target portion designation unit 14 has a function of designating a target portion X whose image to be captured by the image pickup device 50 on the workpiece 60 (see FIG. 3) arranged in the virtual space. The target portion X is, for example, a point, a line, or a plane on a surface of the workpiece 60. An operator can designate the target portion X, for example, by using an arbitrary input means while checking the virtual space displayed on the display unit.

Figure 4A:
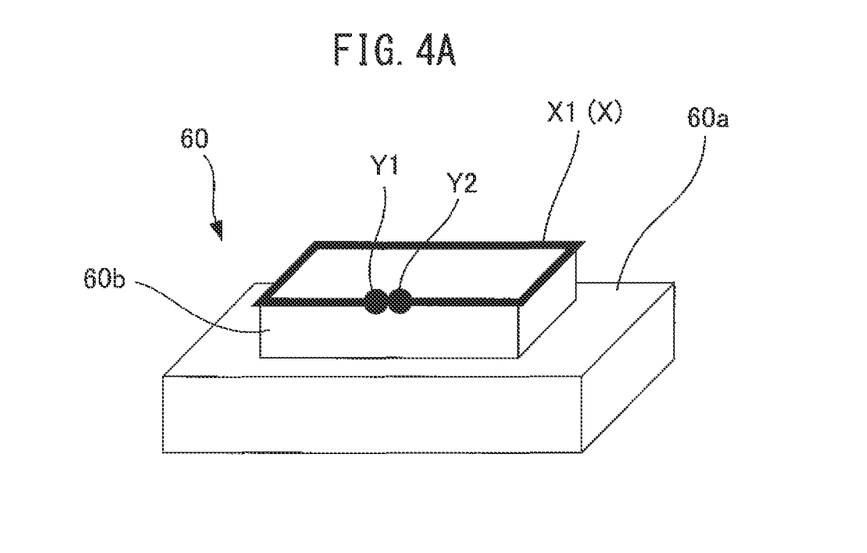
FIG. 4A is a perspective view depicting an example of a target portion of the workpiece.
Figure 4B:
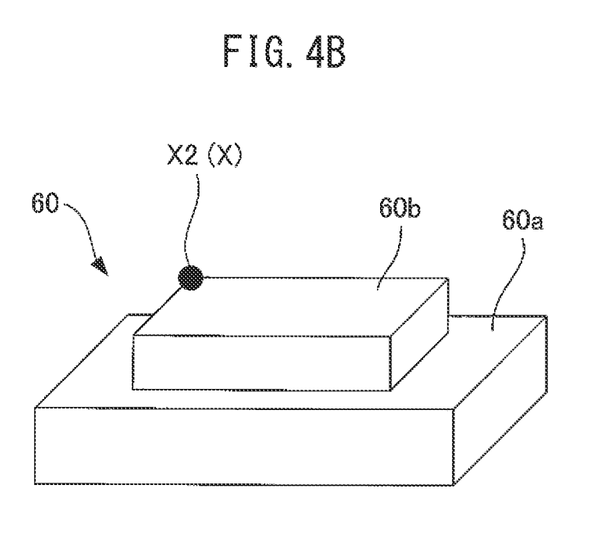
FIG. 4B is a perspective view depicting another example of the target portion of the workpiece.
Figure 4C:
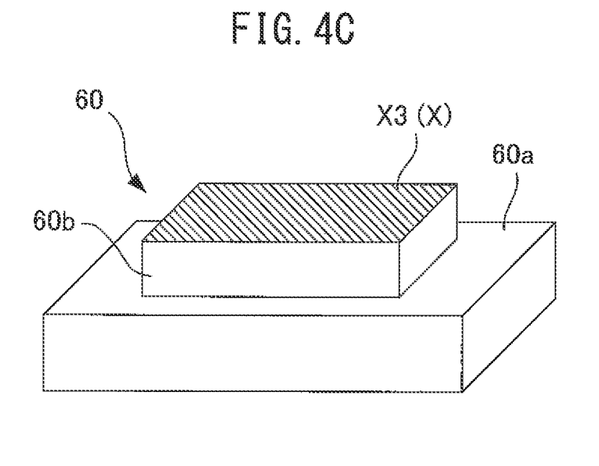
FIG. 4C is a perspective view depicting another example of the target portion of the workpiece.

FIGS. 4A to 4C are perspective diagrams depicting examples of the target portion X of the workpiece 60. FIG. 4A indicates a target portion X1 defined along an edge of the upper portion 60b of the workpiece 60 by thick lines. The target portion X1 has a substantially closed shape including a start point Y1 and an end point Y2 adjacent to each other. FIG. 4B indicates a target portion X2 defined at one corner of the upper portion 60b of the workpiece 60 by a black dot. FIG. 4C indicates a target portion X3 defined on an upper surface of the upper portion 60b of the workpiece 60, in which the target portion X3 is indicated by hatching. In the example of FIG. 4C, an entire upper surface of the workpiece 60 is designated as the target portion X. However, the target portion X may be designated over a part of the upper surface.

Figure 5:
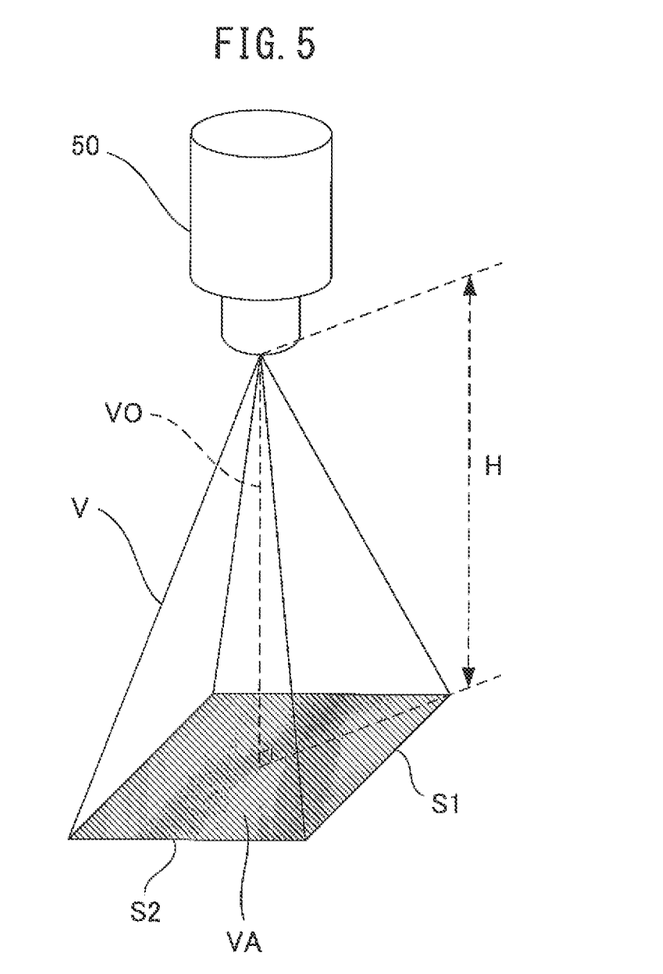
FIG. 5 is a conceptual diagram depicting a visual field of the image pickup device.

The visual field designation unit 16 has a function of designating a visual field area VA of the image pickup device 50. FIG. 5 is a conceptual diagram depicting a visual field V of the image pickup device 50. As depicted in FIG. 5, the visual field V is defined in the virtual space, for example, as a quadrangular pyramid shape model whose center axis line is a visual line VO of the image pickup device 50. Instead of the quadrangular pyramid model, a conical or cylindrical shape model may be used. The visual field area VA indicates a range of the visual field V on a plane that is distant, for example, by a height H of the visual field V from the image pickup device 50 and extends perpendicularly to the visual line VO. A size of the visual field area VA is determined, for example, by designating a size of a first side S1 and a size of a second side S2 extending in a direction perpendicular to the first side S1. Alternatively, information including a focal length of the image pickup device 50, a size (the number of pixels) of an image to be captured, and the height H of the visual field may be input to calculate the size of the visual field area VA from the information.

The position determination unit 20 has a function of determining a position of the image pickup device 50 for capturing an image of the target portion X of the workpiece 60 by the image pickup device 50. For example, when a continuous line is designated as the target portion X (see FIG. 4A), the position of the image pickup device 50 is determined so that the visual field area VA of the image pickup device 50 is flush with the upper surface of the upper portion 60b of the workpiece 60 and a center of the visual field area VA coincides with the start point of the target portion X (reference sign "Y1" in FIG. 4A). Specifically, the position determination unit 20 acquires a normal line direction with respect to the surface of the workpiece 60 including the target portion X from information on the shape of the workpiece 60 and determines a position distant by the height H of the visual field from the start point of the target portion X in the acquired normal line direction, as the position of the image pickup device.

When the target portion X is a point (see FIG. 4B), the position of the image pickup device 50 is determined, for example, so that the center of the visual field area VA coincides with the target portion X. When the target portion X is a plane (see FIG. 4C), the position of the image pickup device 50 is determined, for example, so that the center of the visual field area VA coincides with a center of the target portion X. In this manner, the position determination unit 20 is configured to be able to determine the position of the image pickup device 50 with respect to the target portion X by designating a distance between the target portion X and the image pickup device 50.

The judgment unit 18 has a function of judging whether or not the image pickup device 50 can capture a full image of the target portion X, based on the visual field area VA designated by the visual field designation unit 16 and the position of the image pickup device 50 determined by the position determination unit 20. For this purpose, for example, when the target portion of the workpiece 60 is a line or a plane, the target portion is converted into a group of points and the judgment unit 18 executes the above judgment processing, based on whether or not each point corresponding to the target portion X is included in the range of the visual field area VA.

Figure 6A:
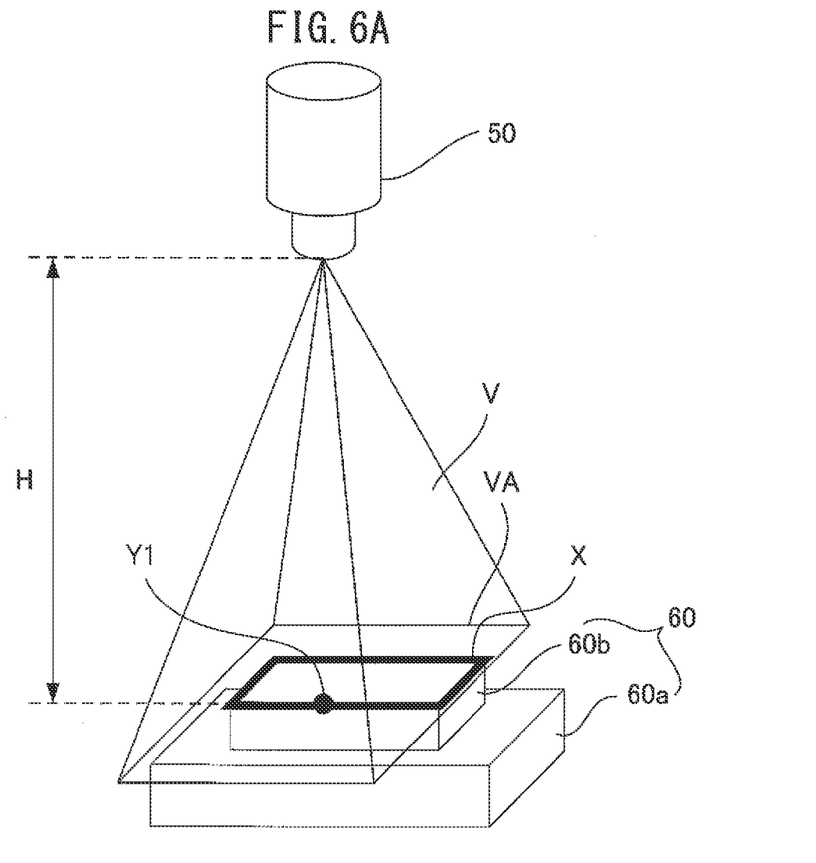
FIG. 6A is an illustration depicting an example of a positional relationship between a visual field area of the image pickup device and the target portion.
Figure 6B:
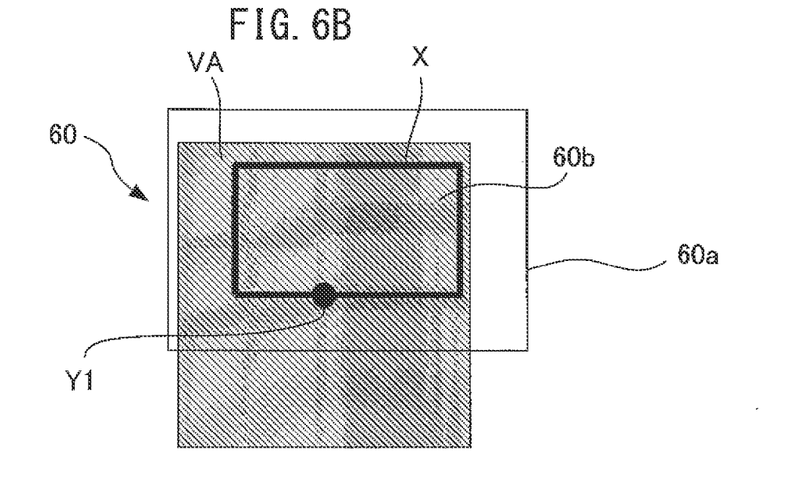
FIG. 6B is an illustration depicting the example of the positional relationship between the visual field area of the image pickup device and the target portion.

FIGS. 6A and 6B are diagrams depicting an example of a positional relationship between the visual field area VA of the image pickup device 50 and the target portion X. FIGS. 6A and 6B shows the case in which the edge of the workpiece 60 is designated as the target portion X, as depicted in FIG. 4A. The image pickup device 50 is arranged in such a position that the center of the visual field area VA of the image pickup device 50 coincides with the start point Y1 of the target portion X and that the image pickup device 50 is distant by the height H of the visual field v from the start point Y1 in the normal line direction with respect to the surface of the workpiece 60.

As can be seen from FIG. 6B, the target portion X of four sides of a rectangular shape indicated by thick lines is entirely included in the range of the visual field area VA. In other words, the judgment unit 18 judges that the image pickup device 50 arranged in this position can capture a full image of the target portion X. Accordingly, in this case, the position determination unit 20 completes a step of determining the position of the image pickup device 50 and outputs the position of the image pickup device 50 determined at that time to the position storage unit 22.

Figure 7A:
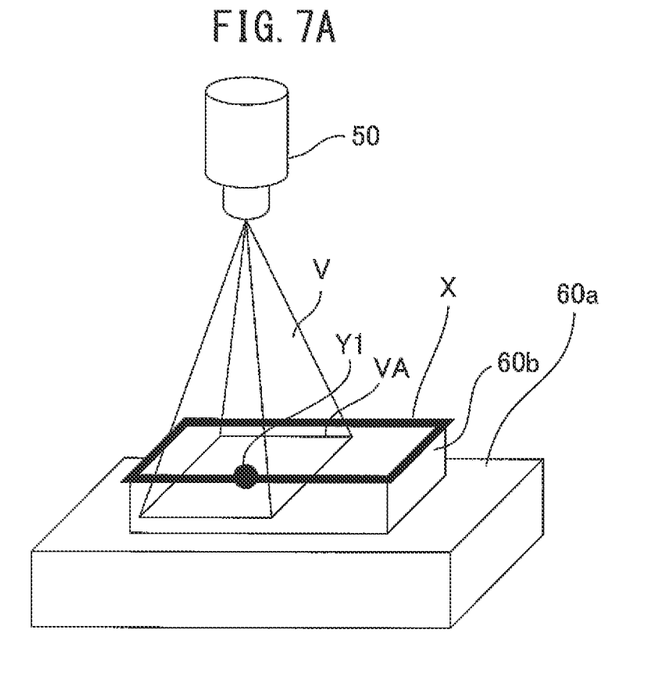
FIG. 7A is an illustration depicting another example of the positional relationship between the visual field area of the image pickup device and the target portion.
Figure 7B:
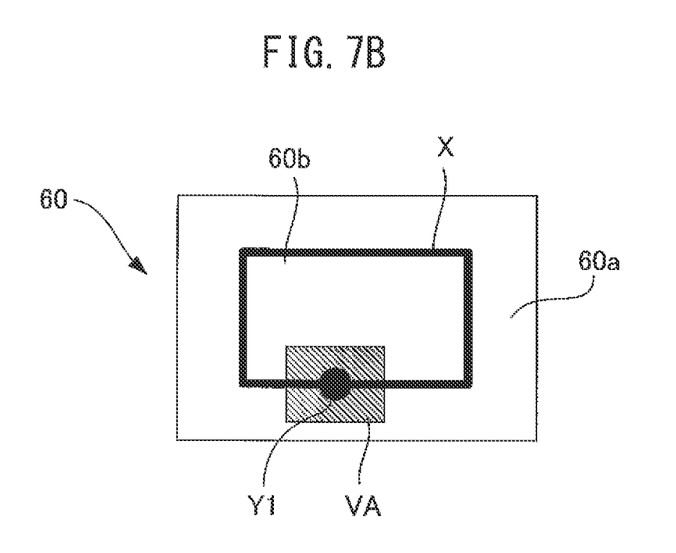
FIG. 7B is an illustration depicting the example of the positional relationship between the visual field area of the image pickup device and the target portion.

FIGS. 7A and 7B are diagrams depicting a positional relationship between the visual field area VA of the image pickup device 50 and the target portion X. In this case, as depicted in FIG. 7B, only a part of the target portion X is included in the range of the visual field area VA. Accordingly, the judgment unit 18 judges that the image pickup device 50 cannot capture a full image of the target portion X. In this case, the position determination unit 20 determines an additional position(s) of the image pickup device 50. In other words, during an image pickup step, the image pickup device 50 captures images of the target portion X from a plurality of different positions.

Figure 8A:
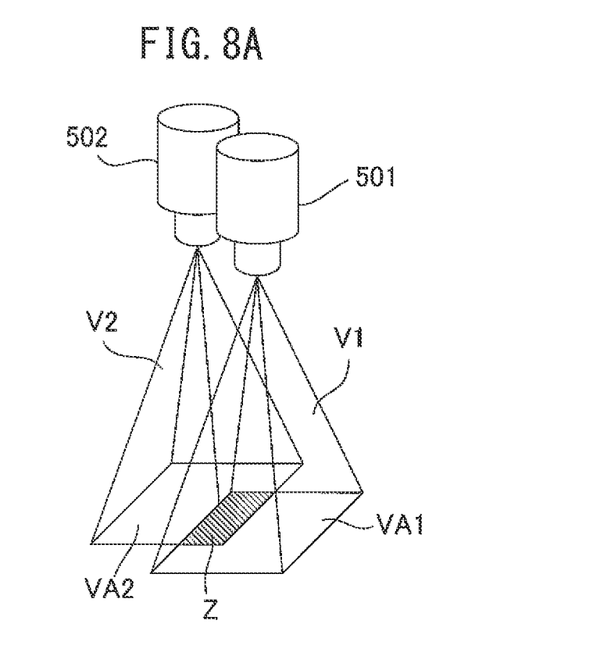
FIG. 8A is a diagram depicting a superimposition area in which visual field areas of image pickup devices arranged in a plurality of positions superimpose on each other.
Figure 8B:
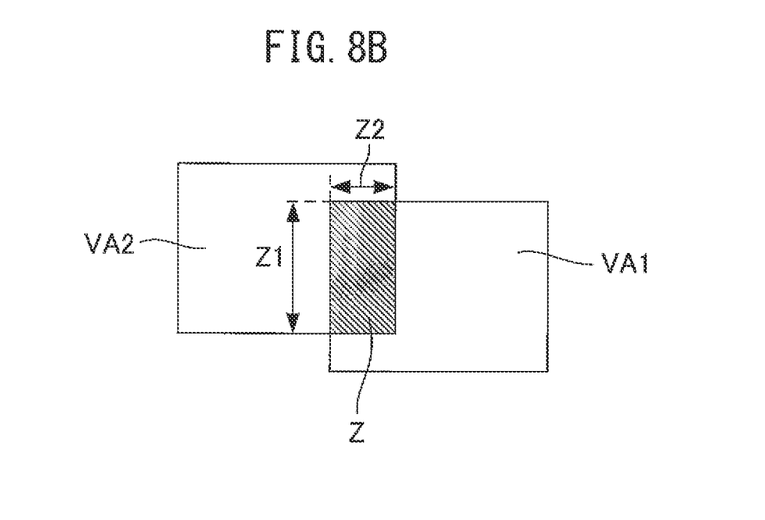
FIG. 8B is a diagram depicting the superimposition area in which the visual field areas of the image pickup devices arranged in the plurality of positions superimpose on each other.

The additional position(s) of the image pickup device 50 for capturing images of the target portion X is sequentially determined by the position determination unit 20, for example, according to a size of a superimposition area Z in which the visual field areas VA superimpose on each other. FIGS. 8A and 8B are diagrams depicting the superimposition area Z of the visual field areas VA of the image pickup devices 50 arranged in a plurality of positions. FIGS. 8A and 8B depict an image pickup device 501 having a first visual field V1 and arranged in a first position and an image pickup device 502 having a second visual field V2 and arranged in a second position, respectively. The drawings also depict a superimposition area Z in which a visual field area VA1 of the first visual field V1 and a visual field area VA2 of the second visual field V2 superimpose each other.

For example, the superimposition area Z may be set such that at least one of a size Z1 in a first direction and a size Z2 in a second direction perpendicular to the first direction is less than a predetermined threshold value, or alternatively, such that an area of the superimposition area Z becomes less than a predetermined threshold value. In other words, the position determination unit 20 sequentially determines an additional position(s) of the image pickup device 50 that satisfies a predetermined superimposition condition, while comparing the sizes Z1 and Z2 or the area of the superimposition area Z with a corresponding threshold value.

Figure 9A:
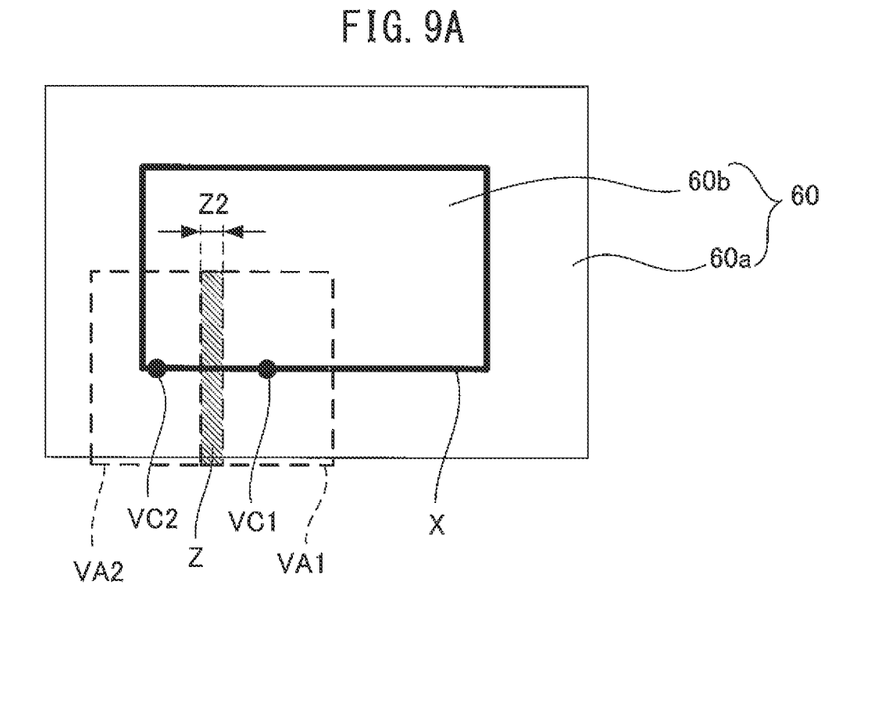
FIG. 9A is a diagram for illustrating a determination method for determining positions of a plurality of image pickup devices according to a superimposition condition.
Figure 9B:
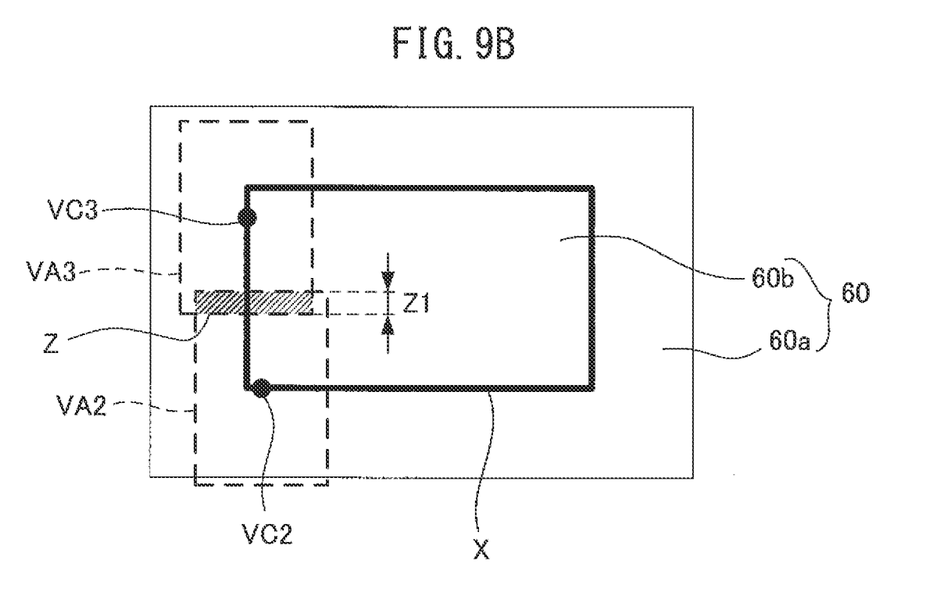
FIG. 9B is a diagram for illustrating a determination method for determining the positions of the plurality of image pickup devices according to another superimposition condition.

FIGS. 9A and 9B are diagrams for illustrating a determination method for determining the positions of a plurality of image pickup devices 50 according to superimposition conditions. In FIG. 9A, a visual field area VA1 of the image pickup device 50 arranged in a first position and a visual field area VA2 of the image pickup device 50 arranged in a second position are indicated by broken lines, respectively. The superimposition area Z in which those visual field areas VA1 and vA2 superimpose on each other is indicated by hatching.

A center VC1 of the first visual field area VA1 coincides with the start point of the target portion X (reference sign "Y1" of FIG. 4A). In addition, a center VC2 of the second visual field area VA1 is positioned on a line of the target portion X. The position determination unit 20 calculates a size or an area of the superimposition area Z with the assumption that the image pickup device 50 moves from the position corresponding to the first visual field area VA1 to the position corresponding to the second visual field area VA2 while the center of the visual field area remains on the line of the target portion X. In this way, for example, a position where the size Z2 of the superimposition area Z is less than a predetermined threshold value, i.e., a position corresponding to the visual field area VA2 can be calculated.

In FIG. 9B, the visual field area VA2 of the image pickup device 50 arranged in the second position and a visual field area VA3 of the image pickup device 50 arranged in a third position are indicated by broken lines, respectively. A center VC3 of the visual field area VA3 is positioned on the line of the target portion X. The position determination unit 20 calculates a size or an area of the superimposition area Z with the assumption that the image pickup device 50 is moved in such a manner that the center of the visual field area moves along the line of the target portion X. Then, the visual field area VA3 corresponding to a position in which, for example, the size Z1 of the superimposition area Z is less than a predetermined threshold value.

The position determination unit 20 repeats the position determination step described with reference to FIGS. 9A and 9B to determine a plurality of positions of the image pickup devices 50 in which the full image of the target portion X can be captured. Then, the respective positions of the image pickup device 50 are output from the position determination unit 20 to the position storage unit 22 and stored therein.

The image pickup program creation unit 24 has a function of creating an image pickup program taught to the robot 100 according to positional information of the image pickup device 50 stored in the position storage unit 22. In other words, the image pickup program includes a teaching content for positioning the image pickup device 50 in a position in which the image of the target portion X can be captured and executing the capturing of the image of the target portion X.

The processing program creation unit 26 has a function of creating a processing program for processing the workpiece 60. The processing program creation unit 26 creates a processing program for processing the target portion X based on the position of the target portion X obtained as a result of simulation of the image pickup program in the virtual space. Alternatively, the processing program creation unit 26 executes the image pickup program in an actual work space and then processes an image of the target portion X obtained as a result of the execution to create a processing program. The processing program includes content for positioning the processing tool 104 in a position corresponding to the target portion X and executing processing.

Figure 10:
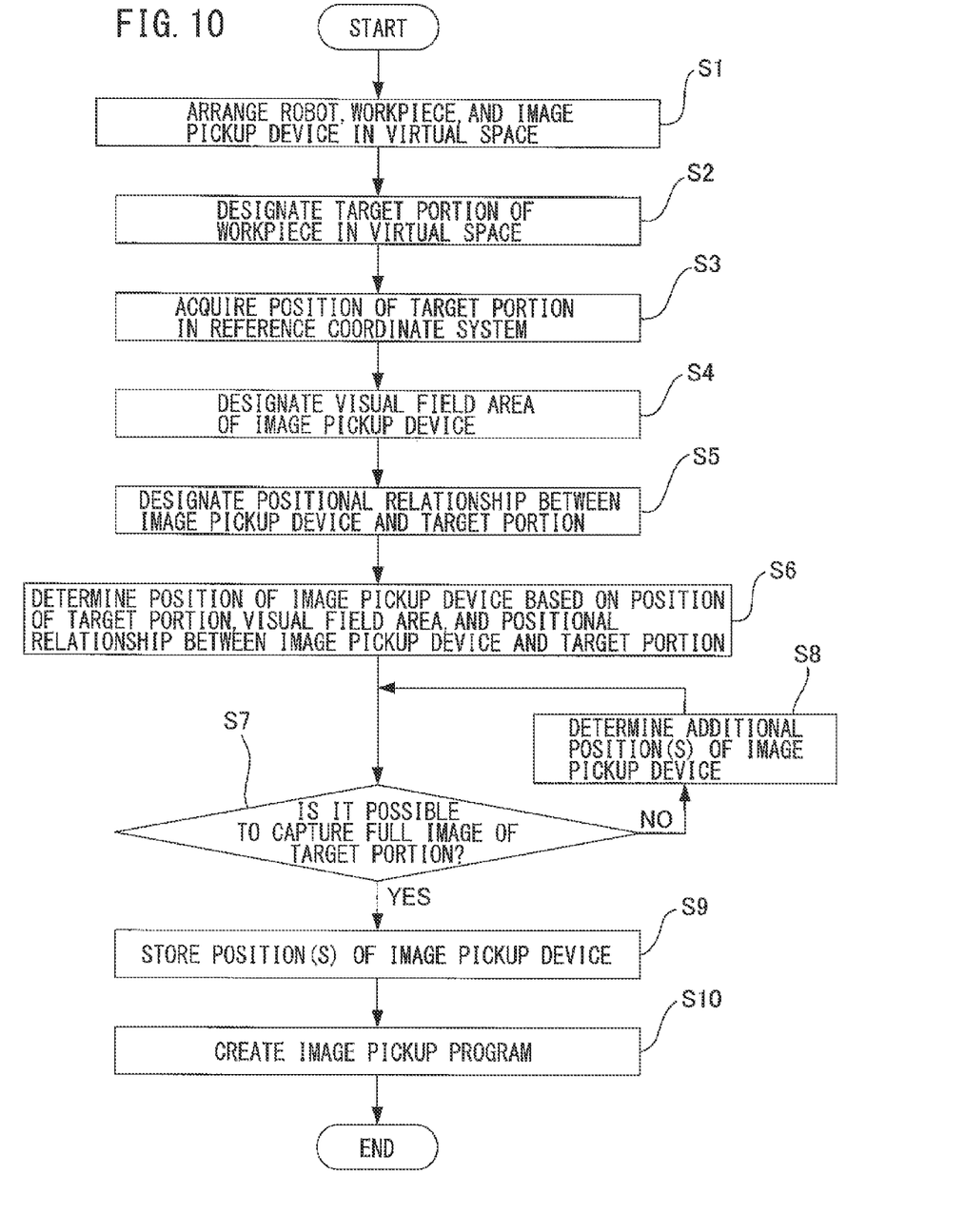
FIG. 10 is a flowchart depicting a processing flow executed by the robot programming apparatus according to one embodiment of the invention.
Figure 11:
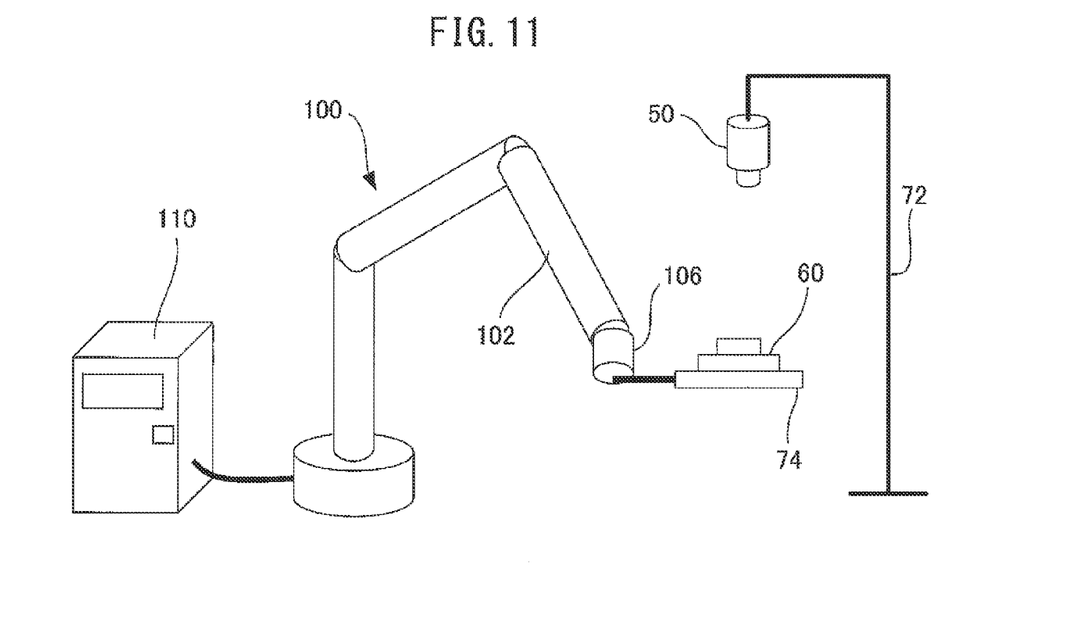
FIG. 11 is a schematic diagram depicting a robot, an image pickup device, and a workpiece arranged in a work space.

FIG. 10 is a flowchart showing a processing flow executed by the robot programming apparatus 10 according to one embodiment. For convenience of description, each step is described in a sequential order. However, those skilled in the art would understand that the order of the steps is not intended to be limited to that in the description, as well as would understand that some of the steps may be simultaneously executed in parallel.

First, at step S1, the virtual space creation unit 12 creates a virtual space. In addition, the models of the respective elements including at least the three-dimensional model of the workpiece 60 are arranged in the virtual space (see FIG. 3).

At step S2, the target portion designation unit 14 designates the target portion X whose image is to be captured by the image pickup device 50, on the model of the workpiece 60 in the virtual space. At this time, the target portion X is designated, for example, in a workpiece coordinate system defined for the workpiece 60. Next, at step S3, a position of the target portion X in a reference coordinate system is calculated based on a positional relationship between the workpiece coordinate system and the reference coordinate system and a position of the target portion X in the workpiece coordinate system.

Furthermore, at step S4, the visual field designation unit 16 designates the visual field area VA of the image pickup device 50. At step S5, a positional relationship between the image pickup device 50 and the target portion X is designated. Information designated at steps S4 and S5 are input, for example, by an operator, and used in calculation executed by the position determination unit 20. In an alternative embodiment, the visual field area VA and the positional relationship between the image pickup device 50 and the target portion X may be automatically calculated based on information specific to the image pickup device 50, for example, information such as a focal distance, a size of an image to be captured, and a height of the visual field.

Next, at step S6, the position determination unit 20 determines a position of the image pickup device 50 for capturing an image of the target portion X, based on the position of the target portion X calculated at step S3, the visual field area VA designated at step S4, and the positional relationship between the image pickup device 50 and the target portion X designated at step S5.

Next, at step S7, the judgment unit 18 judges whether or not a full image of the target portion X can be captured by the image pickup device 50 arranged in the position determined at step S6.

When it is determined at step S7 that the full image of the target portion X cannot be captured, the processing goes on to step S8, at which the position determination unit 20 determines a position of the image pickup device 50 in which a next image pickup step is to be executed. An additional position of the image pickup device 50 determined at step S8 is, for example, a position that satisfies a predetermined superimposition condition with respect to the visual field area VA of the image pickup device 50 in the latest position, as described above. Step S7 and the subsequent step S8 are repeated until it is judged at step S7 that the full image of the target portion X can be captured.

On the other hand, when it is judged that the full image of the target portion X can be captured at step S7, the processing proceeds to step S9. At step S9, the position storage unit 22 stores the position of the image pickup device 50 determined at step S6 and, where applicable, at step S8.

Next, at step S10, the image pickup program creation unit 24 creates an image pickup program for the robot 100 based on the position of the image pickup device 50 stored at step S9. The created image pickup program is sent to the control device 110 (FIG. 1) for controlling the robot 100. For example, as depicted in FIG. 1, when the image pickup device 50 is fixed near the wrist 106 of the robot 100, the robot 100 positions the image pickup device 50 in a position taught by the image pickup program.

FIGS. 11 to 14 are schematic diagrams depicting a robot 110, an image pickup device 50, and a workpiece 60 arranged in work spaces in another exemplary configuration. According to the exemplary configuration depicted in FIG. 11, the image pickup device 50 is fixed to a jig 72, and the workpiece 60 is fixed to the wrist 106 of the robot 100 through a jig 74. In this case, the robot 100 positions the workpiece 60 in a position taught by the image pickup program, thereby achieving the positional relationship between the workpiece 60 and the image pickup device 50 in which the image of the target portion X can be captured by the image pickup device 50.

Figure 12:
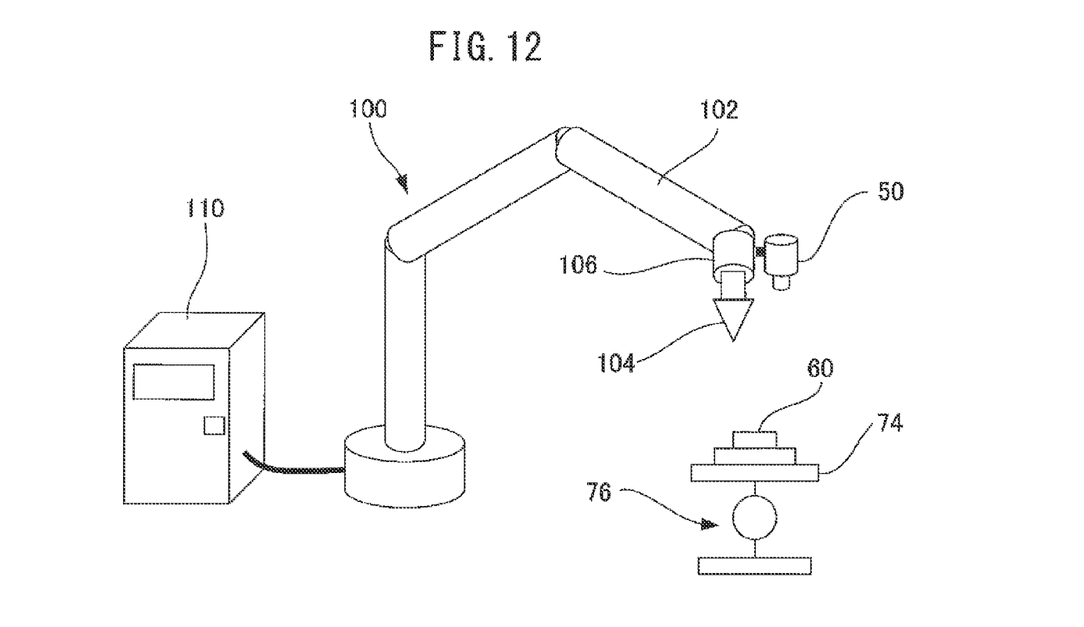
FIG. 12 is a schematic diagram depicting a robot, an image pickup device, and a workpiece arranged in a work space.

According to an exemplary configuration depicted in FIG. 12, the image pickup device 50 is fixed to the wrist 106 of the robot 100, and the workpiece 60 is fixed to a movable device 76 through the jig 74. The movable device 76 is an arbitrary movable means other than the robot, which is provided with a movable mechanism unit such as a ball screw driven by, for example, one or two or more electric motors. The movable device 76 is adapted to change at least one of the position and the posture of the workpiece 60. Alternatively, although not depicted in the drawing, the workpiece 60 may be fixed to the wrist 106 of the robot 100 and the image pickup device 50 may be fixed to such a movable element. In either case, the robot 100 is controlled according to the teaching content of the image pickup program, thereby achieving the positional relationship between the workpiece 60 and the image pickup device in which the image pickup device 50 can capture the image of the target portion X of the workpiece 60.

Figure 13:
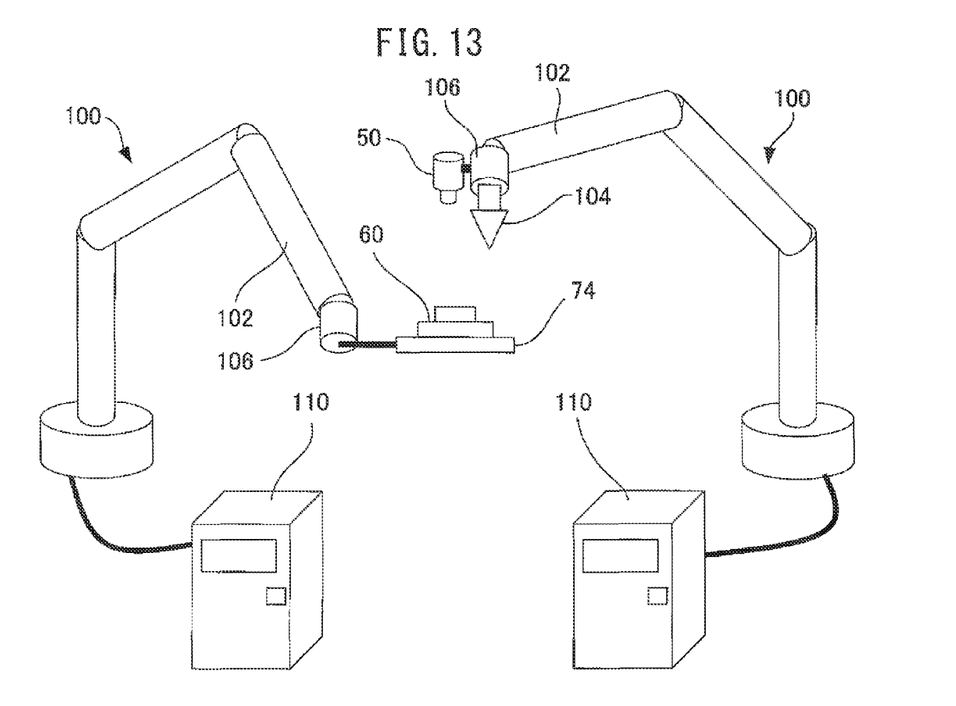
FIG. 13 is a schematic diagram depicting a robot, an image pickup device, and a workpiece arranged in a work space.

According to an exemplary configuration depicted in FIG. 13, the image pickup device 50 and the workpiece 60, respectively, are fixed to wrists 106 of different robots 100. In this case, similarly to the other examples, at least one of the robots 100 is controlled according to the teaching content of the image pickup program, thereby achieving the positional relationship between the workpiece 60 and the image pickup device 50 in which the image pickup device 50 can capture the image of the target portion X of the workpiece 60.

Figure 14:
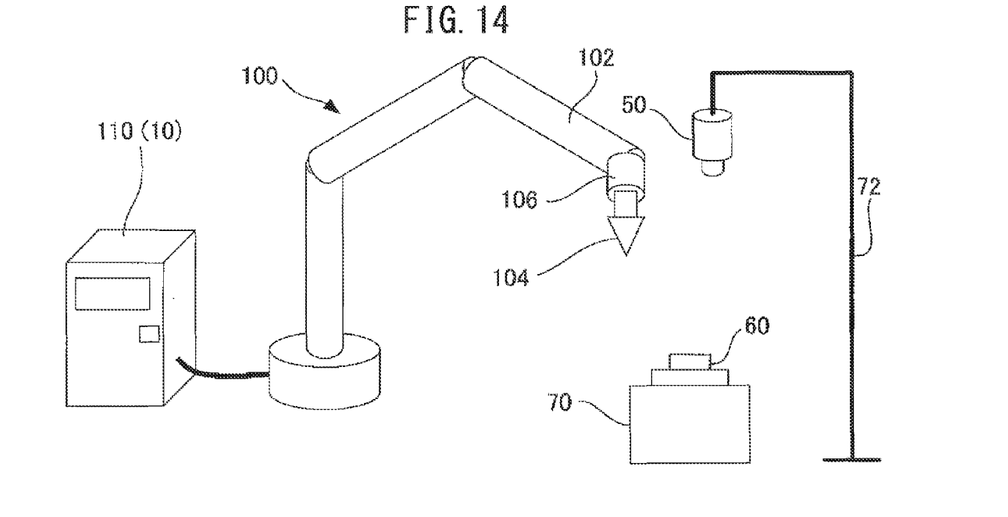
FIG. 14 is a schematic diagram depicting a robot, an image pickup device, and a workpiece arranged in a work space.

According to an exemplary configuration depicted in FIG. 14, the image pickup device 50 is fixed to the jig 72, and the workpiece 60 is fixed to the jig 70. In this case, the positional relationship between the image pickup device 50 and the workpiece 60 is obtained from a position of the image pickup device 50 at the time of image capturing determined by the position determination unit 20. Based on the obtained positional relationship, one of a position and a posture of the jig 72 to which the image pickup device 50 is fixed can be adjusted. Then, according to the image pickup program, the image pickup device 50 is started to capture the image of the target portion X of the workpiece 60.

EFFECT OF THE INVENTION

According to the robot programming apparatus including the above configuration, the position of the image pickup device when capturing an image of the target portion is determined in the virtual space, and according to the result, an image pickup program is created. The robot executes the image pickup step according to the image pickup program being taught. Accordingly, the operator can easily determine the position of the image pickup device at the image pickup step and thus can execute the image pickup step efficiently.

While various embodiments and modifications of the present invention have been described hereinabove, it is apparent to those skilled in the art that operational effects intended by the present invention can also be achieved by other embodiments and modifications. Particularly, it is possible to omit or replace the constituent elements of the above-described embodiments and modifications, and it is also possible to add a known means, without departing from the scope of the invention. In addition, it is apparent to those skilled in the art that the present invention can be embodied by arbitrarily combining features of the plurality of embodiments disclosed explicitly or implicitly in the present specification.

What is claimed is:

1. A robot programming apparatus for creating a robot program to be taught to a robot which is used to process a workpiece arranged in a work space, the robot programming apparatus comprising:

a virtual space creation unit for creating a virtual space that expresses the work space in three-dimensions;

a target portion designation unit for designating a target portion whose image is to be captured by an image pickup device, on a model of the workpiece arranged in the virtual space;

a position determination unit for determining at least one position of the image pickup device for capturing the image of the target portion by the image pickup device in the virtual space;

a position storage unit for storing the at least one position of the image pickup device determined by the position determination unit;

an image pickup program creation unit for creating an image pickup program to be taught to the robot so that the image pickup device captures the image of the target portion according to the at least one position of the image pickup device stored in the position storage unit; and a judgment unit for judging whether or not the full image of the target portion can be captured when the image pickup device is arranged in one position determined by the position determination unit, wherein the position determination unit is configured to determine an additional position of the image pickup device different from the one position when the judgment unit judges that the full image of the target portion cannot be captured, and wherein the position determination unit is configured, when determining a plurality of positions of the image pickup device, to determine the plurality of positions of the image pickup device so that the image pickup device in the respective positions adjacent to each other has ranges of visual fields so as to superimpose on each other over a predetermined range, the robot programming apparatus further comprising a processing program creation unit for creating a processing program for processing the workpiece on a position of the target portion obtained by simulating the image pickup program in the virtual space.

2. The robot programming apparatus according to claim 1, wherein the position determination unit is configured to determine the at least one position of the image pickup device in which the image pickup device has a predetermined positional relationship with respect to the target portion.

3. The robot programming apparatus according to claim 2, wherein the position determination unit includes a visual field designation unit for designating a range of a visual field of the image pickup device and is configured to determine the at least one position of the image pickup device in which a full image of the target portion can be captured, based on the predetermined positional relationship between the image pickup device and the target portion and the range of the visual field.

4. The robot programming apparatus according to claim 2, wherein the predetermined positional relationship between the image pickup device and the target portion is designated by a distance between the image pickup device and the target portion.

5. The robot programming apparatus according to claim 4, wherein the distance between the image pickup device and the target portion is a distance along a direction perpendicular to a surface of the workpiece including the target portion.

6. The robot programming apparatus according to claim 1, wherein the target portion is a point, a line, or a plane on the surface of the workpiece.

7. The robot programming apparatus according to claim 1, wherein the image pickup program includes a teaching content for the robot that controls a position and a posture of at least one of the image pickup device and the workpiece.

8. The robot programming apparatus according to claim 1, wherein the image pickup program includes a teaching content for teaching the image pickup device fixed so as to have a predetermined positional relationship determined by the position determination unit with respect to the workpiece fixed to a predetermined position, so that the image pickup device captures the image of the target portion of the workpiece.

* * * * *